US005491202A

United States Patent [19]
Umehara et al.

[11] Patent Number: 5,491,202
[45] Date of Patent: Feb. 13, 1996

[54] LOW GLOSS POWDER COATING COMPOSITION AND METHOD FOR COATING THEREWITH

[75] Inventors: Takafumi Umehara; Eiji Shimada; Tadashi Sugimoto, all of Yokohama, Japan

[73] Assignee: NOF Corporation, Tokyo, Japan

[21] Appl. No.: 301,786

[22] Filed: Sep. 7, 1994

[51] Int. Cl.$^6$ .................................................. C08F 20/00
[52] U.S. Cl. ........................ 525/438; 525/440; 525/441; 525/443; 525/444; 528/45; 528/80; 528/83; 528/86; 528/129
[58] Field of Search ..................... 525/438, 440, 525/441, 443, 444; 528/45, 80, 83, 86, 129

[56] References Cited

FOREIGN PATENT DOCUMENTS

| 63-154771 | 6/1988 | Japan . |
| 64-001770 | 1/1989 | Japan . |
| 1098671 | 4/1989 | Japan . |

Primary Examiner—Samuel A. Acquah
Attorney, Agent, or Firm—Flynn, Thiel, Boutell & Tanis

[57] ABSTRACT

A powder coating composition for forming a low gloss coating film based on thermosetting polyester resins exhibiting only a little fluctuation of the resultant low gloss value even if an unequality in the mixing proportion of components or in the baking condition exists, comprising three thermosetting polyester resins (A), (B) and (C) and a hardener (D), wherein the weight ratio of the polyester resin (A) to the polyester resin (B) is in the range of 90/10–70/30 and that of the polyester resin (A) to the polyester resin (C) is in the range of 85/15–60/40 and the equivalent ratio of the polyester resin (A, B or C) to the hardener (D) is each in the range of 0.8 to 1.25 and wherein the polyester resins (A), (B) and (C) are selected from those in which the moduli of elasticity $E_a$, $E_b$ and $E_c$ for the products of the curing reaction of these resins with the hardener (D), respectively, after 3 minutes' curing with the hardener (D) at 200° C. hold a relationship that the differences between the moduli of elasticity $E_{b-a}=E_b-E_a$ and $E_{c-a}=E_c-E_a$ are maintained in the following ranges, respectively:

20 dyn/cm$^2$ < $E_{b-a}$ < 10$^3$ dun/cm$^2$ and 1 dyn/cm$^2$ < $E_{c-a}$ < 10 dyn/cm$^2$

7 Claims, 4 Drawing Sheets

Weight Ratio of Resin (A)/Resin (B)

LOW GLOSS POWDER COATING COMPOSITION AND METHOD FOR COATING THEREWITH

FIELD OF THE INVENTION

The present invention relates to a powder coating composition for forming a low gloss coating film, in particular to a powder coating composition based on polyester resins capable of adjusting the gloss of the resulting coating film at any voluntary value, as well as to a method for coating various substrates with it.

BACKGROUND OF THE INVENTION

Low gloss powder coatings have been used for forming lusterless coating films. Up to date, low gloss powder coating compositions based on polyester, in which the gloss value of the coating is reduced by incorporating an extender pigment, such as silica, talc or the like, have been known. These powder coating compositions reduce the gloss value by the formation of minute surface irregularities on the coating film due to the incorporation of the extender pigment.

In such powder coating compositions, however, the gloss value will not be lowered down to 50 or less, even when the content of the extender pigment in the coating composition is increased over 30% by weight. In addition, the resulting coating film becomes hard and brittle together with a quite inferior appearance, when such a high content of the extender pigment is employed.

A powder coating composition for glossless coating based on polyester resins has been known, in which the above-mentioned defects were obviated by compounding two polyester resins exhibiting different curing reaction rates (Japanese Patent Application Kokai Nos. 154771/1988, 1770/1989, 98671/1989 and 109468/1991). This powder coating composition realizes the reduction of gloss value by forming a fine wrinkle pattern over the coating surface due to a difference in the rate of curing reaction of the polyester with the hardener existing, between the two polyester resins incorporated and permits the coating to reach a gloss value of below 10.

However, these conventional powder coating compositions suffer from a large fluctuation in the gloss value caused even by a small difference in, for example, the mixing proportion of the components, the condition of baking of the resulting coating and so on. In the industrial production of such powder coating compositions, occurrence of fluctuation in the mixing proportion cannot be avoided, resulting in considerable unequalities between the production lots, so that it is difficult to maintain a definite gloss value requested by users. Thereto adds further a problem that coating films of the same gloss value are difficultly obtainable even using the same coating composition, if different baking conditions are to be employed.

SUMMARY OF THE INVENTION

An object of the present invention is to obviate the above-mentioned problems and to provide a powder coating composition capable of forming a low gloss coating which exhibits a desired definite low gloss value with only a little fluctuation in the gloss value even if an unequality in the mixing proportion of each component and in the baking condition of the resulting coating occurs and which permits adjustment of the gloss at any voluntary value over a considerable range.

Another object of the present invention is to provide a method for coating a substrate with the above-mentioned powder coating composition as well as low gloss coating films obtained thereby.

The powder coating composition for low gloss coating according to the present invention comprises three thermosetting polyester resins (A), (B) and (C) and a hardener (D), the weight ratio of the polyester resin (A) to the polyester resin (B) being in the range of 90/10–70/30 and the weight ratio of the polyester resin (A) to the polyester resin (C) being in the range of 85/15–60/40 and the equivalent ratio of the polyester resin (A, B or C) to the hardener (D) being each in the range of 0.8 to 1.25, wherein the polyester resins (A), (B) and (C) are selected from those in which the moduli of elasticity $E_a$, $E_b$ and $E_c$ for the products of the curing reactions of the resins (A), (B) and (C) with the hardener (D), respectively, after 3 minute's curing with the hardener (D) at 200° C. hold a relationship that the differences between the moduli of elasticity $E_{b-a}=E_b-E_a$ and $E_{c-a}=E_c-E_a$ are maintained in the following ranges, respectively:

$$20 \text{ dyn/cm}^2 < E_{b-a} < 10^3 \text{ dyn/cm}^2 \text{ and}$$

$$1 \text{ dyn/cm}^2 < E_{c-a} < 10 \text{ dyn/cm}^2$$

DETAILED DESCRIPTION OF THE INVENTION

Polyester resins exhibit different curing reaction rates and different gelation times due to the difference in the reactant group, its content, the hardener, its amount used and so on. When a mixture of such polyester resins of different reaction rates and a hardener is cured, minute irregularities will be formed over the coating surface due to the difference in the curing reaction rate between them, whereby a delustered coating is obtained.

For decreasing the gloss value of the coating in a binary polyester resin mixture, the lowering of the gloss value will be higher for a mixture of polyester resins with greater reaction rate difference. It is even possible to produce a coating layer having a gloss value of 10 or less. However, as seen in FIG. 3, the gloss value will vary considerably, when the mixing ratio of the two resins deviates only a little from a definite mixing proportion, at which the resulting coating has a minimum gloss value.

Figure 3:
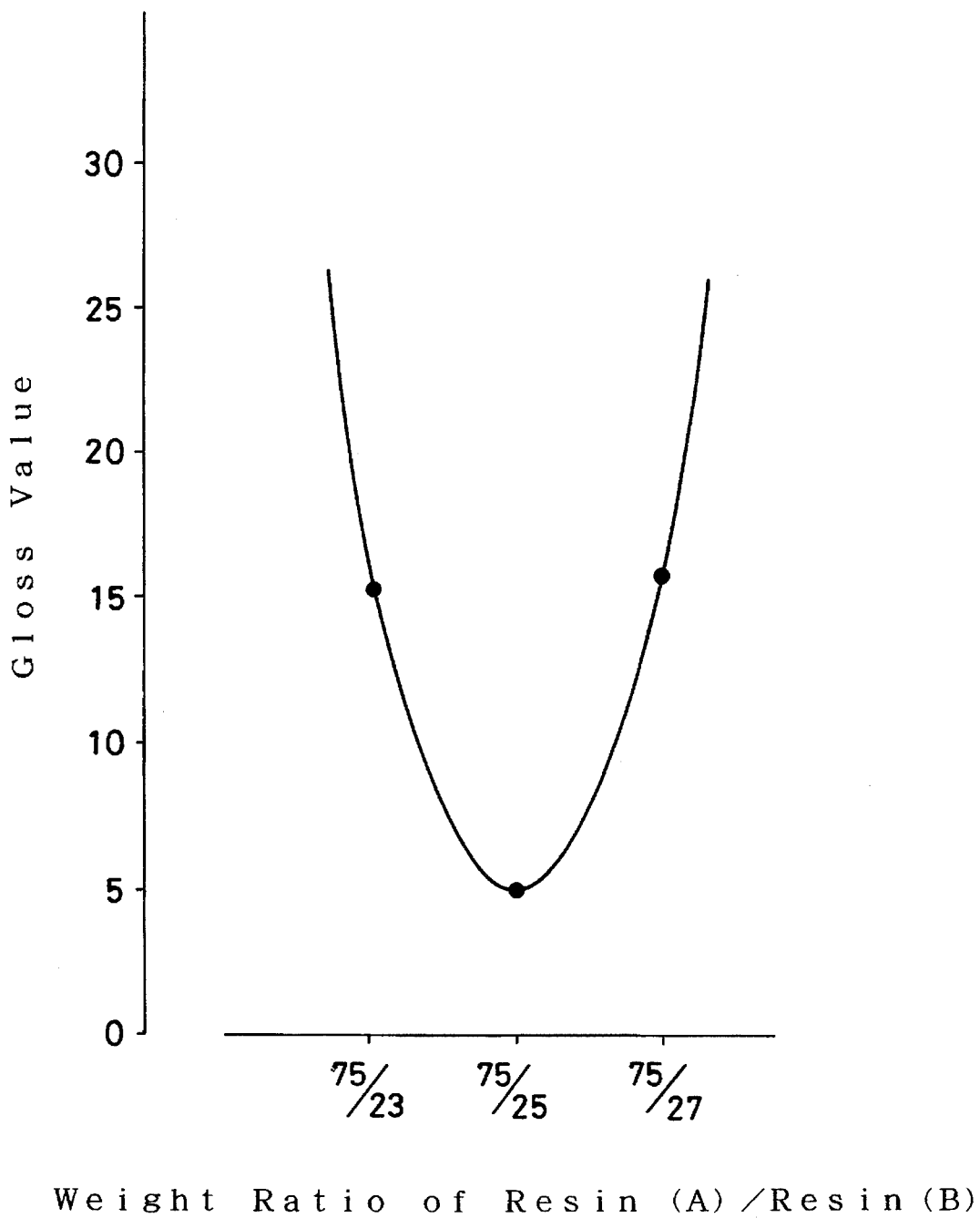
FIG. 3 is a graph showing the relationship between the mixing ratio of the polyester resins (A)/(B) and the coating gloss value from the curing reaction of polyesters (A), (B) with a hardener (D), wherein the polyesters exhibit different curing rates with the hardener (D).

FIG. 3 is a graph showing the relationship between the mixing ratio of the polyester resins in a binary mixture of polyesters (A) and (B), on the one hand, and the gloss value of the resulting coating, on the other hand. As seen, a gloss value of 5, for example, is attained by a mixture of 75 parts by weight of the polyester resin (A) and 25 parts by weight of the polyester resin (B), whereas the gloss value rises up to a value of 16–17 upon deviation of the mixing ratio to 75/23 or to 75/27.

If a gloss value difference of 10 or higher exists between two coatings, they are visually discriminated as different coatings. Even using the same coating composition containing 25 parts by weight of the polyester resin (B), considerably different gloss values of the resulting coatings, in despite of consistent other properties, may be obtained, when the baking condition is altered from 200° C. for 10 minutes to 180° C. for 20 minutes.

In contrast thereto, if a binary mixture Of the polyester resin (A) and the polyester resin (B) having a greater rate of curing reaction with a hardener (D) for the resin (B) than for the resin (A) is combined with a further polyester resin (C) exhibiting a rate of curing reaction with the hardener (D) somewhat higher than that of the resin (A), the gloss value change caused by an about, 10% variation in the weight ratio of the resin (B) to the resin (A) can be restricted within a gloss value of 5.

According to the present invention, three polyester resins (A), (B) and (C) and a hardener (D) are employed. Here, the weight ratio of the polyester resin (A) to the polyester resin (B) is in the range of 90/10–70/30 and that of the polyester resin (A) to the polyester resin (C) is in the range of 85/15–60/40 and the equivalent ratio of the polyester resin (A, B or C) to the hardener (D) is in the range of 0.8 to 1.25, wherein the polyester resins (A), (B) and (C) are selected from those in which the moduli of elasticity $E_a$, $E_b$ and $E_c$ for the products of the curing reactions of the resins (A), (B) and (C) with the hardener (D), respectively, after 3 minutes' curing with the hardener (D) at 200° C. hold such a relationship that the differences between the moduli of elasticity $E_{b-a}=E_b-E_a$ and $E_{c-a}=E_c-E_a$ are maintained in the following ranges, respectively:

$$20 \text{ dyn/cm}^2 < E_{b-a} < 10^3 \text{ dyn/cm}^2 \text{ and}$$

$$1 \text{ dyn/cm}^2 < E_{c-a} < 10 \text{ dyn/cm}^2$$

These polyester resins hold such a relationship therebetween that the differences of the moduli of elesticity $E_{b-a}$ and $E_{c-a}$ are maintained within the range as given above. While there is no limitation for the absolute values of the moduli of elesticity $E_a$, $E_b$ and $E_c$, they are held in the relationship:

$$E_b >> E_c > E_a$$

Figure 2:
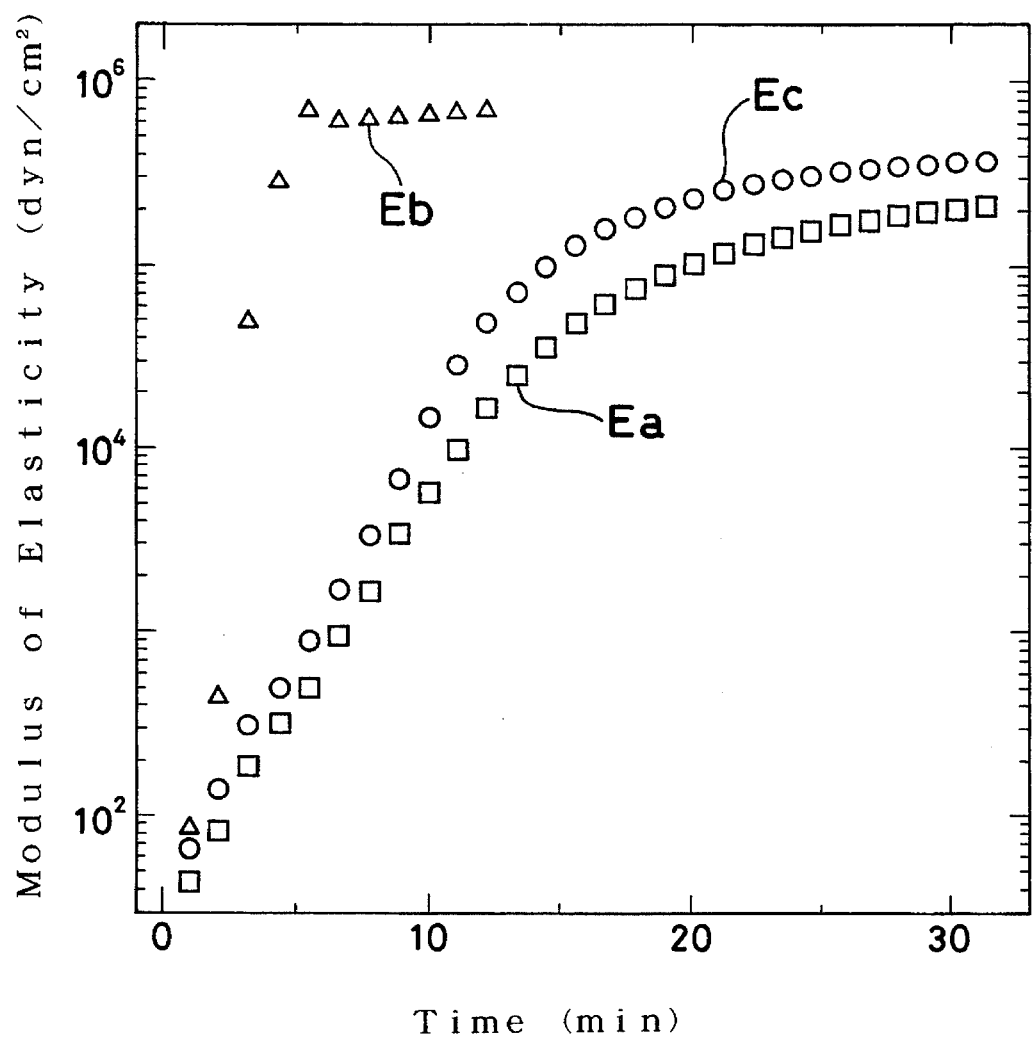
FIG. 2 is a graph showing the course of temporal variation of the moduli of elesticity $E_a$, $E_b$ and $E_c$ for the products of the curing reactions of the polyester resins (A), (B) and (C), respectively, with the hardener ( D ) at 200° C. for Example 1.

FIG. 2 is a graph showing the course of variation of the moduli of elasticity $E_a$, $E_b$ and $E_c$ in time observed for an embodiment wherein each of the polyester resins (A), (B) and (C) of Example 1 as given in Table 1 appearing afterwards is subjected to a curing reaction with the hardener (D) at 200° C. FIG. 2 indicates the above circumstances. Thus, according to the present invention, three polyester resins (A), (B) and (C) are employed, in which the difference of $E_b-E_a=E_{b-a}$ is large and the difference of $E_c-E_a=E_{c-a}$ is small.

For the parameter of the reaction rate, there may be employed, for example, the reaction rate constant, the gelation time, the rate of variation of the modulus of elasticity and so on. Determination of the reaction rate constant is difficult to carry out for such a reaction as the curing of a polymer resin for coating where a molecular weight distribution is included. Determination of the gelation time is not accurate, since the end point (gelation time) is, in general, determined by visual observation on a hot plate. In contrast, the determination of variation in the modulus of elasticity can be effected with a high accuracy using, for example, Laboplastomill of Toyo Seiki K.K. or Soliquidmeter of Rheology K.K.

The modulus of elasticity is determined using these apparatuses by heating a curable mixture composed of the polyester resins and a hardner in a mixing proportion in terms of equivalent ratio of each polyester resin (A, B or C) to the hardener (D) of 0.8–1.25 at 200° C. and observing the elasticity at this temperature after three minutes. The difference of modulus of elasticity is the difference of such values for the different polyester resins.

The polyester resins (A), (B) and (C) to be incorporated in the powder coating composition for low gloss coating according to the present invention are each a condensation product of a polycarboxylic acid, such as terephthalic acid, isophthalic acid, phthalic anhydride, 2,6-naphthalene dicarboxylic acid, succinic acid, adipic acid, azelaic acid, trimellitic acid, pyromellitic acid, and the like, for the acid component, with a polyol, such as trimethylolethane, trimethylolpropane, 3-methylpentane-1,3,5-triol, glycerin, ethylene glycol, diethylene glycol, 2-propanediol, neopentyl glycol, pentaerythritol and the like, for the alcoholic component.

The polyester resins (A), (B) and (C) to be incorporated in the powder coating composition according to the present invention exhibit different reaction rates for one and the same hardener (curing agent) so as to bring about a difference between $E_{b-a}$ and $E_{c-a}$ as mentioned above. Such difference in the reaction rate can be brought about by, for example, selecting the number of the functional groups, such as hydroxyl groups and carboxyl groups, in the resins or selecting the amount of the catalyst for accelerating the curing reaction between such functional groups and the hardener.

For providing such difference in the reaction rate by selecting the content of the hydroxyl groups in the resins, it is, preferable to use as the polyester resin (A) those which have hydroxyl values in the range of 20–38 mg KOH/g. As the commercial products for these resins, there may be employed, for example, "ESTER RESIN ER-6610", "ESTER RESIN ER-6650" and "ESTER RESIN ER-6800", all trademarks of Nippon Ester Co., Ltd.; "UPICACOAT GV-150", "UPICACOAT GV-160", "UPICACOAT GV-165" and "UPICACOAT GV-730" all trademarks of Japan Upica Co. Ltd.; and "FINEDIC M-8020", a trademark of Dainippon Ink & Chemicals, Inc. as well as products corresponding to them.

As the polyester resin (B), it is preferable to use those which have hydroxyl values of 100 mg KOH/g or more, such as those commercially available products of "30-3011" and "30-3002", both trademarks of McWHORTER Technologies, Inc.; "XI-7009", a trademark of Nippon Ester Co., Ltd. and corresponding products.

As the polyester resin (C), it is preferable to use those which have hydroxyl values in the range from 40 to 80 mg KOH/g, such as those commercially available products of, for example, "UPICACOAT GV-740, "UPICACOAT GV-741" "UPICACOAT GV-710", all trademarks of Japan Upica Co., Ltd.; and "ESTER RESIN ER-6570", a trademark of Nippon Ester Co., Ltd. and corresponding products.

For the case where the difference in the reaction rate is brought about by the difference in the carboxyl group content, it is preferable to use as the polyester resin (A) those which have acid values in the range from 20 to 45 mg KOH/g. As the commercial products for these resins, there may be employed, for example, "ESTER RESIN ER-8105" and "ESTER RESIN ER-8107", both trademarks of Nippon Ester Co., Ltd.; FINEDIC A-229-M", "FINEDIC M-8900" and "FINEDIC M-8930", all trademarks of Dainippon Ink & Chemicals Inc.; "URALAC P-2400" and "URALAC P-3500", both trademarks of DSM Resins BV; "CRILCOAT 320", a trademark of UCB Chemicals, Inc. and other corresponding products.

As the polyester resin (B), it is preferable to use those which have acid values of 100 mg KOH/g or more, such as those commercially available products of "ESTER RESIN XE-3009", "ESTER RESIN XE-93001" and "ESTER RESIN XE-94002", all trademarks of Nippon Ester Co., Ltd.; "UPICACOAT PX3064", a trademark of Japan Upica Co., Ltd.; "FINEDIC M-8540" a trademark of Dainippon Ink & Chemicals Inc. and corresponding products.

As the polyester resin (C), it is preferable to use those which have acid values in the range from 53 to 90 mg KOH/g, such as those commercially available products of, for example, "ESTER RESIN ER-8100" and "ESTER RESIN" "ER-8101" both trademarks of Nippon Ester Co., Ltd.; "UPICACOAT GV-230" a trademark of Japan Upica Co., Ltd.; "FINEDIC M-8500" and "FINEDIC M-8830", both trademarks of Dainippon Ink & Chemicals Inc.; "URALAC P-2065" a trademark of DSM Resins BV; and "CRILCOAT 340" a (trademark) of UCB Chemicals, Inc. and corresponding products.

While the hydroxyl value and the acid value for the ester resins mentioned above are important as a parameter for the selection of the resins, the selection is not restricted to these values. Thus, other resins having acid values or hydroxyl values outside the above-mentioned range may also be employed, so long ,as a difference in the modulus of elasticity as a measure of a difference in the reaction rate can be brought about.

The mixing ratio of the three polyester resins may be in the range such that the weight proportion of the polyester resin (A)/polyester resin (B) is in the range of from 90/10 to 70/30, preferably from 85/15 to 74/26, with the weight proportion of the polyester resin (A)/polyester resin (C) in the range of from 85/15 to 60/40, preferably from 82/18 to 62/38. If the mixing ratio is outside of such limitation, the contemplated gloss value of the resulting coating is difficult to attain and the gloss value becomes unstable.

The coating gloss value to be attained can be adjusted at every voluntary value by suitably selecting the difference $(E_b-E_a)$ of the modulus of elasticity values $E_b$ and $E_a$ as defined previously for the curing reaction products of the polyester resins (A) and (B) with the hardener (D), respectively, within the definite range explained previously. For example, the larger the value $E_{b-a}$, the lower the gloss value will be and vice versa. This phenomenon can be utilized for adjusting the gloss value of the resulting coating film at any voluntary value within the range of 3–50.

It is preferable for the powder coating composition according to the present invention that the glass transition temperature Tg of each of the polyester resins (A), (B) and (C) is in the range of 35°– 100° C. If Tg is not higher than 35° C., the powder coating composition, tends to agglomerate to form solid grains and causes even blockings. If Tg exceeds 100° C., the smoothness of the resulting coating film will tend to be inferior.

While the powder coating composition according to the present invention comprises the three polyester resins (A), (B) and (C) as inevitable components, it is possible that further polyester resins are incorporated so as to provide each a stepwise curing rate difference upon curing of the coating film.

For the hardener (D) to be employed according to the present invention, any compound capable of causing curing reaction in a pulverous condition with the polyester resins to be employed according to the present invention may be used. For example, blocked isocyanate compounds and amino compounds may be employed for the polyester resins having hydroxyl functional groups. The blocked isocyanate compounds may be those in which aliphatic, aromatic and alicyclic polyisocyanates, such as tolylene diisocyanate, isophorone diisocyanate and hexamethylene diisocyanate, are blocked with a known blocking agent, such as methanol, isopropanol, butanol, benzyl alcohol, ethyl lactate, methyl ethyl ketoxime or ε-caprolactam. As the commercial products therefor, for example, ADDUCT "B-1530" "ADDUCT B-1065" and "ADDUCT BF-1540" all trademarks of Hüls AG and "24-2400" a trademark of McWHORTER Technologies, Inc., may be enumerated. The amino compounds may be those having two or more amino groups, such as melamine resins and guanamine resins. As the commercial product therefor, for example, "POWDERLINK 1174" a trademark of American Cyanamid Co., may be used.

For the polyester resins having carboxyl groups as the functional group, glycidyl compounds and amide compounds may be employed as the hardener. The glycidyl compounds may be those having two or more glycidyl groups, such as diglycidyl terephthalate, diglycidyl p-oxybenzoate, triglycidyl isocyanurate, compounds of hydantoin, cycloaliphatic epoxy resins, aliphatic epoxy resins, epoxy resins based on bisphenol-A, epoxy resins based on cresol novolaks, epoxy resins based on phenol novolaks and the like. The amide compounds may be those having two or more functional groups of hydroxy etc., such as tetra-β-hydroxyalkyl amide. As the commercial product therefor, for example, "PRIMID XL-552" a trademark of Rohm & Haas Co. may be enumerated.

As the catalyst for the curing reaction, for example, imidazole compounds and phosphorus-containing compounds may be used. As the imidazole compounds, for example, 2-methylimidazole, 2-isopropylimidazole, 2-heptadecylimidazole, 2-undecylimidazole and 2-phenyl- 4,5-dihydroxymethyl-imidazole, may be enumerated. As the commercial product therefor, for example, "CURESOLE $C_{17Z}$" a trademark of Shikoku Chemicals Corp. may be enumerated. As the phosphorus-containing compounds, for example, triphenylphosphine, tri(nonylphenyl)phosphine and triethylphosphine may be enumerated.

The proportion of each of the polyester resins (A), (B) and (C) relative to the hardener (D) should be maintained within a range of 0.8 to 1.25, preferably 0.84 to 1.25 equivalents per one equivalent of the hardener (D). If the equivalent ratio of the polyester resin to the hardener is less than 0.8, the cross-linking of the polyester resins in the coating film is insufficient and, if this exceeds over 1.25, the material properties of the resulting coating film become inferior due to the unreacted remainder of the hardener in the coating film.

The powder coating composition according to the present invention may contain, on requirement, pigments up to a content of 70 parts by weight per 100 parts by weight of the sum of the polyester resins plus the hardener. As the pigments, inorganic pigments, such as titanium dioxide, carbon black and iron oxide; extender pigments, such as talc, precipitated barium sulfate and silica; and organic pigments, such as cyanin blue, azo pigments and so on may be employed. Other additives and modifiers, such as leveling agent, antifoaming agent, antioxidant, UV-absorber and so on may be incorporated within a range not obstructing the material properties of the coating film.

The powder coating composition for low gloss coating according to the present invention is prepared by blending the powder components described above and preferably melting the blend at a temperature not reaching the hardening temperature of the composition, for example, at 80°–100° C., with kneading and crushing the cooled solidified mass. The average particle size of the so-prepared powder coating composition may, in general, be in the range of 20–150 μm, preferably in the range of 30–100 μm.

The powder coating composition according to the present invention prepared as above, can be coated on various substrates by means of a powder coating technique, such as electrostatic spray coating, with subsequent baking of the coated layer at a temperature capable of causing curing of the polyester resins and the hardener to form a lustreless coating film.

Any substrate can be coated by the powder coating composition according to the present invention, if it is capable of withstanding the condition used in baking the coated layer. The substrate may preferably be a metal plate with a thickness of 0.2 to 2 mm, such as steel panels, galvanized steel panels, aluminum panels and stainless steel panels.

For effecting coating of such a substrate with the powder coating composition according to the present invention, a commercial electrostatic coater (with an application voltage of −50 to −90 kV) or other dry application apparatus for powder coating may be employed to build up a uniform coating layer, whereupon the resulting coated layer is subjected to baking in a baking furnace, such as hot blast baking furnace, infrared furnace and induction furnace, at a temperature of 150°–300° C., preferably 160°–250° C. for 20 seconds to 60 minutes, preferably for 30 seconds to 30 minutes, in order to obtain a lustreless coating film in a thichness of 20–200 μm, preferably 30– 100 μm. By such coating procedures, lustreless coating of every gloss value can be obtained.

Such a low gloss value of the coating film is brought about by scattered light reflection from the finally cured irregular coating surface with a fine surface irregularity. In the conventional binary polyester resin system, a comparatively monotonous surface irregularity is apt to be reached.

Figure 4:
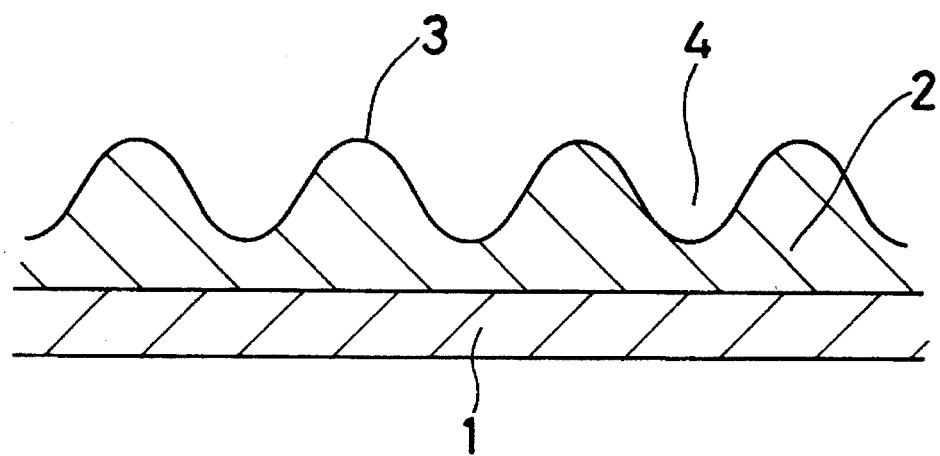
FIG. 4 illustrates the coating film according to a typical conventional powder coating composition in a schematic sectional view.

FIG. 4 shows such a surface irregularity of the coating layer by a conventional binary resin powder coating composition in a schematic sectional view. The numeral 1 represents the substrate and 2 is the low gloss coating layer. On the coating layer 2, a fine wrinkle pattern with relatively simple-shaped irregularity composed of protrusions 3 and indentations 4 is produced due to the difference in the curing reaction rate between the two polyester resins, whereby a mat appearance is brought about. In this case, the lowest gloss value is obtained, when the distance between the neighboring two protrusions 3 is the smallest, namely, when the density of the irregularity is the highest. Here, a relatively high gloss value by an enwidening of the protrusion distance is apt to occure, since a possible deviation of the mixing proportion of the two polyester resins may exist.

Figure 1:
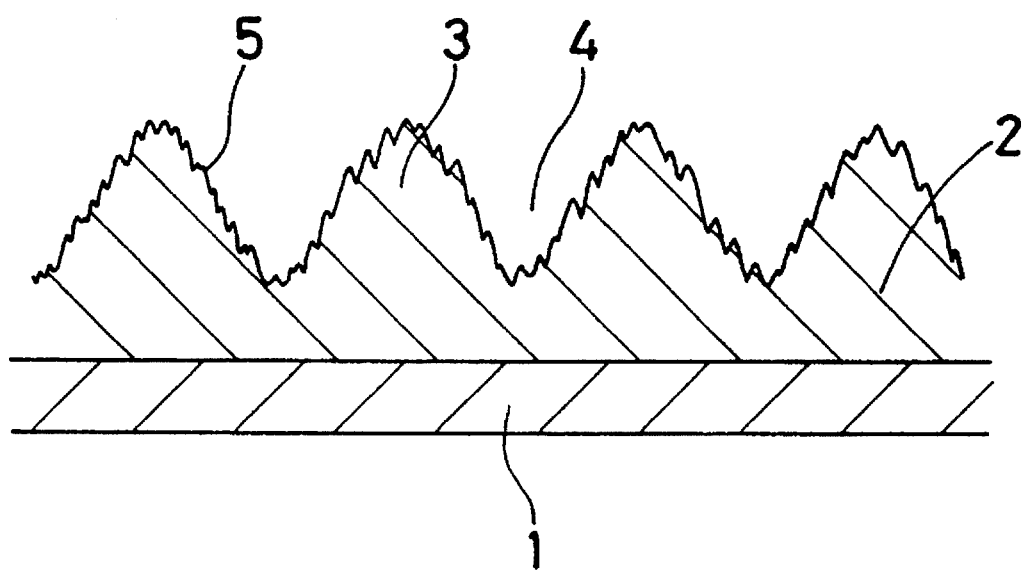
FIG. 1 illustrates the coating film according to the present invention in a schematic sectional view.

In contrast thereto, by the powder coating composition according to the present invention, as seen from the schematic illustration of the coating layer section shown in FIG. 1, additional secondary fine irregularity 5 is formed on the wrinkling surface with protrusions 3 and indentations 4, due to the employment of at least three polyester resins for realizing a step wise difference in the curing reaction of the resins in the coating layer 2. This secondary fine irregularity 5 provides a rather uniform scattering of the reflected light, even when some enwidening of the protrusion distance on the coating layer may occur due to a possible fluctuation or inconsistency of the resin mixing proportion or the baking condition. It is believed that the primary wrinkle by the protrusions 3 and the indentations 4 is caused by the curing reaction rate difference between the polyester resins (A) and (B) and the secondary irregularity 5 is caused by the curing reaction rate difference between the polyester resins (A) and (C).

Thus, according to the present invention, an intended constant low gloss value below 50 can be attained even if the mixing proportion of the polyester resins (A) and (B) deviates by an amount of about 10% by weight. When a different baking condition is to be employed, the gloss value is maintained at a constant low value due to the formation of the secondary fine irregularity 5.

As described above, a low gloss coating film can be obtained using the powder coating composition according to the present invention, even if some fluctuations and inconsistencies in the resin blending condition and coating layer baking condition occur, since three polyester resins exhibiting definite curing reaction rate difference between them are incorporated. Thus, according to the present invention, a powder coating composition for a low gloss coating film is provided, which, together with a superior mechanical strength of the coating film, can maintain a contemplated gloss value without suffering from an intolerable deviation and which is capable of adjusting the gloss value at any voluntary value within a wide range.

PREFERRED EMBODIMENT OF THE INVENTION

Below, the present invention will further be described in detail by way of Examples and Comparative Examples, wherein it is to be noted that the present invention is by no means restricted by such Examples. All the numerical values for the blending proportion of the components are on the weight basis, Examples 1 to 27, Comparative Examples 1 to 38

Using a dry blender (Henschel Mixer of Mitsui Miike Engineering Corp.), powder blend components for each of the powder coating compositions of Examples 1 to 27 as well as of Comparative Examples 1 to 38 as given in Tables 1–4 below were blended uniformly for about 1 minute, whereupon the resulting blend was subjected to melt kneading on an extruding kneader (Buss-co-kneader PR-46 of BUSS AG). The kneaded mixture was cooled to solidify and the resulting solid mass was crushed on a hammer mill, whereupon the crushed mass was screened on a wire sieve of 150-mesh (mesh size 105 μm) to obtain a powder coating composition.

Each of steel test panels with a thickness of 0.5 mm which had ,been treated by zinc phosphate was coated by an electrostatic coating with each of the powder coating compositions prepared as above to a dry powder coating layer thickness of about 50–60 μm and the coating layer was baked at 180° C. for 20 minutes or at 200° C. for 10 minutes. The coating films baked at 180° C. for 20 minutes were tested for their gloss values, Erichsen values and impact resistances. The coating films baked at 200° C. for 10 minutes were tested for their gloss values. The test results are recited also in Tables 1–4.

For determining the modulus of elasticity, each mixture composed of the polyester resin and the hardener in a mixing proportion in terms of equivalent ratio as given in Tables 1–4 was filled in the sample holder of a rheometer (MR-300 Soliquidmeter of Rheology K.K.) heated at 200° C. to melt it. After 3 minutes, the modulus of elasticity for each sample mixture was determined. From this, the differences of the moduli of elasticity between the polyester resins were calculated. In FIG. 2, the course of temporal change of the moduli of elasticity during 30 minutes after filling the sample holder with each sample mixture of combination of the polyester resins (A), (B) and (C) and the hardner (D) of Example 1 is graphically shown.

TABLE 1

| Components and Material Property | Example | | | | | | |
|---|---|---|---|---|---|---|---|
| | 1 | 2 | 3 | 4 | 5 | 6 | 7 |
| Polyester resin (A) | | | | | | | |
| ESTER RESIN ER-6610[1] | 82.0 | 82.0 | 82.0 | | | | |
| UPICACOAT GV-150[2] | | | | | | | |
| FINEDIC M8020[3] | | | | | | | 80.0 |
| ESTER RESIN ER-6650[4] | | | | 75.0 | 75.0 | 75.0 | |
| Polyester resin (B) | | | | | | | |
| 30-3011[5] | 16.0 | 18.0 | 20.0 | 22.0 | 25.0 | 27.0 | |
| XI-7009[6] | | | | | | | 18.0 |
| 30-3002[7] | | | | | | | |
| Polyester resin (C) | | | | | | | |
| UPICACOAT GV-740[8] | | | | | | | 23.0 |
| ESTER RESIN ER-6570[9] | 18.0 | 18.0 | 18.0 | 46.0 | 46.0 | 46.0 | |
| Hardener (D) | | | | | | | |
| ADDUCT B-1530[10] | | | | 55.0 | 55.0 | 55.0 | |
| 24-2400[11] | 24.0 | 24.0 | 24.0 | | | | 26.0 |
| POWDERLINK 1174[12] | | | | | | | |
| Titanium dioxide | 60.0 | 60.0 | 60.0 | 50.0 | 50.0 | 50.0 | 60.0 |
| MODAFLOW[13] | 0.8 | 0.8 | 0.8 | 1.2 | 1.2 | 1.2 | 0.8 |
| OH/NCO equival. ratio | 1.1 | 1.0 | 0.9 | 1.1 | 1.0 | 0.96 | 1.25 |
| Resin wt. ratio (A/B) | 84/16 | 82/18 | 80/20 | 77/23 | 75/25 | 74/26 | 82/18 |
| Resin wt. ratio (A/C) | 82/18 | 82/18 | 82/18 | 62/38 | 62/38 | 62/38 | 78/22 |
| Difference $E_{b-a}$ | $10^{2.8}$ | $10^{2.8}$ | $10^{2.8}$ | $10^{2.5}$ | $10^{2.5}$ | $10^{2.5}$ | $10^{2.0}$ |
| Difference $E_{c-a}$ | $10^{0.5}$ | $10^{0.5}$ | $10^{0.5}$ | $10^{0.5}$ | $10^{0.5}$ | $10^{0.5}$ | $10^{0.9}$ |
| Gloss (200°,10 min)[28] | 9 | 5 | 9 | 24 | 21 | 23 | 34 |
| Gloss (180°,20 min)[28] | 8 | 6 | 9 | 24 | 20 | 22 | 31 |
| Erichsen value (mm)[29] | >7.0 | >7.0 | >7.0 | >7.0 | >7.0 | >7.0 | >7.0 |
| Impact resistance (cm) (½ φ", 1000 g)[30] | 50 | 50 | 50 | 50 | 50 | 50 | 50 |

| Components and Material Property | Example | | | | | |
|---|---|---|---|---|---|---|
| | 8 | 9 | 10 | 11 | 12 | 13 |
| Polyester resin (A) | | | | | | |
| ESTER RESIN ER-6610[1] | | | | | | 75.0 |
| UPICACOAT GV-150[2] | | | 80.0 | 80.0 | 80.0 | |
| FINEDIC M8020[3] | 80.0 | 80.0 | | | | |
| ESTER RESIN ER-6650[4] | | | | | | |
| Polyester resin (B) | | | | | | |
| 30-3011[5] | | | | | | 25.0 |
| XI-7009[6] | 20.0 | 22.0 | | | | |
| 30-3002[7] | | | 18.0 | 20.0 | 22.0 | |
| Polyester resin (C) | | | | | | |
| UPICACOAT GV-740[8] | 23.0 | 23.0 | 44.0 | 44.0 | 44.0 | |
| ESTER RESIN ER-6570[9] | | | | | | 46.0 |
| Hardener (D) | | | | | | |
| ADDUCT B-1530[10] | | | | | | |
| 24-2400[11] | 26.0 | 26.0 | 41.0 | 41.0 | 41.0 | |
| POWDERLINK 1174[12] | | | | | | 22.0 |
| Titanium dioxide | 60.0 | 60.0 | 72.0 | 72.0 | 72.0 | 50.0 |
| MODAFLOW[13] | 0.8 | 0.8 | 1.0 | 1.0 | 1.0 | 1.2 |
| OH/NCO equival. ratio | 1.15 | 1.07 | 0.93 | 0.89 | 0.84 | 1.0 |
| Resin wt. ratio (A/B) | 80/20 | 78/22 | 82/18 | 80/20 | 78/22 | 75/25 |
| Resin wt. ratio (A/C) | 78/22 | 78/22 | 65/35 | 65/35 | 65/35 | 62/38 |
| Difference $E_{b-a}$ | $10^{2.0}$ | $10^{2.0}$ | $10^{1.5}$ | $10^{1.5}$ | $10^{1.5}$ | $10^{2.5}$ |
| Difference $E_{c-a}$ | $10^{0.9}$ | $10^{0.9}$ | $10^{0.6}$ | $10^{0.6}$ | $10^{0.6}$ | $10^{0.8}$ |

TABLE 1-continued

| | | | | | | |
|---|---|---|---|---|---|---|
| Gloss (200°, 10 min)[28] | 32 | 30 | 47 | 45 | 46 | 20 |
| Gloss (180°, 20 min)[29] | 33 | 32 | 45 | 47 | 47 | 22 |
| Erichsen value (mm)[29] | >7.0 | >7.0 | >7.0 | >7.0 | >7.0 | >7.0 |
| Impact resistance (cm) (½ φ", 1000 g)[30] | 50 | 50 | 50 | 50 | 50 | 40 |

TABLE 2

| Components and Material Property | Example | | | | | | |
|---|---|---|---|---|---|---|---|
| | 14 | 15 | 16 | 17 | 18 | 19 | 20 |
| Polyester resin (A) | | | | | | | |
| FINEDIC A-229-M[15] | 82.0 | 82.0 | 82.0 | | | | |
| FINEDIC M-8620[16] | | | | | | | |
| ESTER RESIN ER-8105[17] | | | | 75.0 | 75.0 | 75.0 | |
| URALAC P-3500[18] | | | | | | | 80.0 |
| Polyester resin (B) | | | | | | | |
| ESTER RESIN XE94002[19] | 16.0 | 18.0 | 20.0 | 22.0 | 25.0 | 27.0 | |
| ESTER RESIN XE93001[20] | | | | | | | 18.0 |
| FINEDIC M-8540[21] | | | | | | | |
| Polyester resin (C) | | | | | | | |
| UMC P-2065[22] | | | | | | | 23.0 |
| UPICACOAT GV-230[23] | 24.0 | 24.0 | 24.0 | 46.0 | 46.0 | 46.0 | |
| Hardener (D) | | | | | | | |
| Triglycidyl i-cyanurate | 9.3 | 10.6 | 12.3 | 15.2 | 17.4 | 22.4 | 11.5 |
| EHPE-3150[24] | | | | | | | |
| EPIKOTE 1003F[25] | | | | | | | |
| PRIMID XL-552[26] | | | | | | | |
| CUIRESOLE $C_{171}$[27] | | | | | | | |
| Titanium dioxide | 60.0 | 60.0 | 60.0 | 50.0 | 50.0 | 50.0 | 60.0 |
| MODAFLOW[13] | 0.8 | 0.8 | 0.8 | 1.2 | 1.2 | 1.2 | 0.8 |
| COOH/Glycid. eq. ratio | 1.1 | 1.0 | 0.9 | 1.1 | 1.0 | 0.8 | 1.25 |
| Resin wt. ratio (A/B) | 84/16 | 82/18 | 80/20 | 77/23 | 75/25 | 74/26 | 82/18 |
| Resin wt. ratio (A/C) | 82/18 | 82/18 | 82/18 | 62/38 | 62/38 | 62/38 | 78/22 |
| Difference $E_{b-a}$ | $10^{2.9}$ | $10^{2.9}$ | $10^{2.9}$ | $10^{2.3}$ | $10^{1.3}$ | $10^{1.1}$ | $10^{2.1}$ |
| Difference $E_{c-a}$ | $10^{0.4}$ | $10^{0.4}$ | $10^{0.4}$ | $10^{0.6}$ | $10^{0.6}$ | $10^{0.6}$ | $10^{0.6}$ |
| Gloss (200°, 10 min)[28] | 6 | 7 | 6 | 31 | 30 | 33 | 25 |
| Gloss (180v, 20 min)[28] | 7 | 6 | 5 | 30 | 32 | 35 | 25 |
| Erichsen value (mm)[29] | >7.0 | >7.0 | >7.0 | >7.0 | >7.0 | >7.0 | >7.0 |
| Impact resistance (cm) (½ φ", 1000 g)[30] | 50 | 50 | 50 | 50 | 50 | 50 | 50 |

| Components and Material Property | Example | | | | | | |
|---|---|---|---|---|---|---|---|
| | 21 | 22 | 23 | 24 | 25 | 26 | 27 |
| Polyester resin (A) | | | | | | | |
| FINEDIC A-229-M[15] | | | 80.0 | 80.0 | 80.0 | | 75.0 |
| FINEDIC M-8620[16] | | | | | | 80.0 | |
| ESTER RESIN ER-8105[17] | | | | | | | |
| URALAC P-3500[18] | 80.0 | 80.0 | | | | | |
| Polyester resin (B) | | | | | | | |
| ESTER RESIN XE94002[19] | | | | | | 18.0 | 25.0 |
| ESTER RESIN XE93001[20] | 20.0 | 23.0 | | | | | |
| FINEDIC M-8540[21] | | | 18.0 | 20.0 | 22.0 | | |
| Polyester resin (C) | | | | | | | |
| URALAC P-2065[22] | 23.0 | 23.0 | | | | | |
| UPICACOAT GV-230[23] | | | 44.0 | 44.0 | 44.0 | 24.0 | 46.0 |
| Hardener (D) | | | | | | | |
| Triglycidyl i-cyanurate | 13.1 | 14.3 | | | | | |
| EHPE-3150[24] | | | 27.3 | 28.8 | 30.3 | | |
| EPIKOTE 1003F[25] | | | | | | 75.5 | |

TABLE 2-continued

|  |  |  |  |  |  |  |  |
|---|---|---|---|---|---|---|---|
| PRIMID XL-552[26] |  |  |  |  |  |  | 9.3 |
| CURESOLE $C_{172}$[27] |  |  | 0.4 | 0.4 | 0.4 | 0.4 |  |
| Titanium dioxide | 60.0 | 60.0 | 72.0 | 72.0 | 72.0 | 72.0 | 50.0 |
| MODAFLOW[13] | 0.8 | 0.8 | 1.0 | 1.0 | 1.0 | 1.0 | 1.2 |
| COOH/Glycid. eq. ratio | 1.15 | 1.1 | 0.95 | 0.9 | 0.85 | 1.0 | 1.0 |
| Resin wt. ratio (A/B) | 80/20 | 78/22 | 82/18 | 80/20 | 78/22 | 82/18 | 75/25 |
| Resin wt. ratio (A/C) | 78/22 | 78/22 | 65/35 | 65/35 | 65/35 | 77/23 | 62/38 |
| Difference $E_{b-a}$ | $10^{2.1}$ | $10^{2.1}$ | $10^{1.4}$ | $10^{1.4}$ | $10^{1.4}$ | $10^{1.3}$ | $10^{2.2}$ |
| Difference $E_{c-a}$ | $10^{0.8}$ | $10^{0.8}$ | $10^{0.5}$ | $10^{0.5}$ | $10^{0.5}$ | $10^{0.9}$ | $10^{0.7}$ |
| Gloss (200°, 10 min)[28] | 23 | 24 | 41 | 43 | 42 | 45 | 35 |
| Gloss (180°, 20 min)[28] | 24 | 25 | 42 | 41 | 44 | 46 | 37 |
| Erichsen value (mm)[29] | >7.0 | >7.0 | >7.0 | >7.0 | >7.0 | >7.0 | >7.0 |
| Impact resistance (cm) (½ φ", 1000 g)[30] | 50 | 50 | 50 | 50 | 50 | 50 | 50 |

TABLE 3

| Components and Material Property | Comparative Example | | | | | | |
|---|---|---|---|---|---|---|---|
|  | 1 | 2 | 3 | 4 | 5 | 6 | 7 |
| Polyester resin (A) | | | | | | | |
| ESTER RESIN ER-6610[1] | 82.0 | 82.0 | 82.0 |  |  |  |  |
| UPICACOAT GV-150[2] |  |  |  |  |  |  |  |
| FINEDIC M8020[3] |  |  |  |  |  |  | 80 |
| ESTER RESIN ER-6650[4] |  |  |  | 75.0 | 75.0 | 75.0 |  |
| Polyester resin (B) | | | | | | | |
| 30-3011[5] | 16.0 | 18.0 | 20.0 | 22.0 | 25.0 | 27.0 |  |
| XI-7009[6] |  |  |  |  |  |  | 18.0 |
| 30-3002[7] |  |  |  |  |  |  |  |
| Polyester resin (C) | | | | | | | |
| UPICACOAT GV-740[8] |  |  |  |  |  |  |  |
| ESTER RESIN ER-6570[9] |  |  |  |  |  |  |  |
| Hardener (D) | | | | | | | |
| ADDUCT B-1530[10] |  |  |  | 48.0 | 48.0 | 48.0 |  |
| 24-2400[11] | 28.0 | 28.0 | 28.0 |  |  |  | 33.0 |
| Titanium dioxide | 51.0 | 51.0 | 51.0 | 59.0 | 59.0 | 59.0 | 53.0 |
| MODAFLOW[13] | 1.0 | 1.0 | 1.0 | 1.0 | 1.0 | 1.0 | 1.0 |
| DURCAL 40[14] |  |  |  |  |  |  |  |
| OH/NCO equival. ratio | 1.29 | 1.2 | 1.11 | 1.07 | 1.0 | 0.96 | 1.33 |
| Resin wt. ratio (A/B) |  |  |  |  |  |  |  |
| Resin wt. ratio (A/C) |  |  |  |  |  |  |  |
| Gloss (200°, 10 min)[28] | 15 | 4 | 14 | 30 | 20 | 31 | 45 |
| Gloss (180°, 20 min)[28] | 18 | 8 | 19 | 37 | 26 | 38 | 56 |
| Erichsen value (mm)[29] | 5.4 | >7.0 | >7.0 | >7.0 | >7.0 | >7.0 | 4.2 |
| Impact resistance (cm) (½ φ", 1000 g)[30] | 30 | 50 | 50 | 50 | 50 | 50 | 30 |

| Components and Material Property | Comparative Example | | | | | | |
|---|---|---|---|---|---|---|---|
|  | 8 | 9 | 10 | 11 | 12 | 13 | 14 |
| Polyester resin (A) | | | | | | | |
| ESTER RESIN ER-6610[1] |  |  |  |  |  | 88.5 | 80.0 |
| UPICACOAT GV-150[2] |  |  | 80.0 | 80.0 | 80.0 |  |  |
| FINEDIC M8020[3] | 80 | 80 |  |  |  |  |  |
| ESTER RESIN ER-6650[4] |  |  |  |  |  |  |  |
| Polyester resin (B) | | | | | | | |
| 30-3011[5] |  |  |  |  |  |  |  |
| XI-7009[6] | 20.0 | 22.0 |  |  |  |  | 20.0 |
| 30-3002[7] |  |  | 18.0 | 20.0 | 22.0 |  |  |
| Polyester resin (C) | | | | | | | |
| UPICACOAT GV-740[8] |  |  |  |  |  |  | 34.0 |
| ESTER RESIN ER-6570[9] |  |  |  |  |  |  |  |
| Hardener (D) | | | | | | | |
| ADDUCT B-1530[10] |  |  |  |  |  | 11.5 | 31.0 |
| 24-2400[11] | 33.0 | 33.0 | 28.0 | 28.0 | 28.0 |  |  |
| Titanium dioxide | 53.0 | 53.0 | 51.0 | 51.0 | 51.0 | 66.0 |  |
| MODAFLOW[13] | 1.0 | 1.0 | 1.0 | 1.0 | 1.0 | 1.0 | 1.0 |

TABLE 3-continued

| | | | | | | | |
|---|---|---|---|---|---|---|---|
| DURCAL 40[14] | | | | | | 40.0 | |
| OH/NCO equival. ratio | 1.25 | 1.17 | 0.89 | 0.83 | 0.75 | 1.0 | 1.43 |
| Resin wt. ratio (A/B) | | | | | | | 80/20 |
| Resin wt. ratio (A/C) | | | | | | | 70/30 |
| Gloss (200°, 10 min)[28] | 34 | 47 | 58 | 43 | 55 | 53 | 23 |
| Gloss (180°, 20 min)[28] | 44 | 58 | 62 | 50 | 60 | 62 | 25 |
| Erichsen value (mm)[29] | >7.0 | >7.0 | >7.0 | >7.0 | 5.3 | 2.5 | 5.2 |
| Impact resistance (cm) (½ φ", 1000 g)[30] | 50 | 50 | 50 | 50 | 30 | 10 | 30 |

| Components and Material Property | Comparative Example | | | | |
|---|---|---|---|---|---|
| | 15 | 16 | 17 | 18 | 19 |
| Polyester resin (A) | | | | | |
| ESTER RESIN ER-6610[1] | | | | 80.0 | |
| UPICACOAT GV-150[2] | 75.0 | 60.0 | 93.0 | | |
| FINEDIC M8020[3] | | | | | 72.0 |
| ESTER RESIN ER-6650[4] | | | | | |
| Polyester resin (B) | | | | | |
| 30-3011[5] | 25.0 | | | 20.0 | |
| XI-7009[6] | | | | | 28.0 |
| 30-3002[7] | | 40.0 | 7.0 | | |
| Polyester resin (C) | | | | | |
| UPICACOAT GV-740[8] | | | | 65.0 | 10.0 |
| ESTER RESIN ER-6570[9] | 35.0 | 26.0 | 50.0 | | |
| Hardener (D) | | | | | |
| ADDUCT B-1530[10] | | | | 58.0 | 37.0 |
| 24-2400[11] | 63.0 | 36.0 | 26.0 | | |
| Titanium dioxide | 79.0 | 65.0 | 70.0 | 89.0 | 59.0 |
| MODAFLOW[13] | 1.0 | 1.0 | 1.0 | 1.0 | 1.0 |
| DURCAL 40[14] | | | | | |
| OH/NCO equival. ratio | 0.77 | 1.0 | 1.0 | 1.0 | 1.25 |
| Resin wt. ratio (A/B) | 75/25 | 60/40 | 93/7 | 80/20 | 72/28 |
| Resin wt. ratio (A/C) | 68/32 | 70/30 | 65/35 | 55/45 | 88/12 |
| Gloss (200°, 10 min)[28] | 17 | 72 | 80 | 65 | 73 |
| Gloss (180°, 20 min)[28] | 22 | 75 | 85 | 67 | 77 |
| Erichsen value (mm)[29] | 5.0 | 6.5 | >7.0 | >7.0 | >7.0 |
| Impact resistance (cm) (½ φ", 1000 g)[30] | 30 | 50 | 50 | 40 | 50 |

TABLE 4

| Components and Material Property | Comparative Example | | | | | | |
|---|---|---|---|---|---|---|---|
| | 20 | 21 | 22 | 23 | 24 | 25 | 26 |
| Polyester resin (A) | | | | | | | |
| FINEDIC A-229-M[15] | 82.0 | 82.0 | 82.0 | | | | |
| ESTER RESIN ER-8105[17] | | | | 75.0 | 75.0 | 75.0 | |
| URALAC P-3500[18] | | | | | | | 80.0 |
| Polyester resin (B) | | | | | | | |
| ESTER RESIN XE94002[19] | 16.0 | 18.0 | 20.0 | 22.0 | 25.0 | 27.0 | |
| ESTER RESIN XE93001[20] | | | | | | | 18.0 |
| FINEDIC M-8540[22] | | | | | | | |
| Polyester resin (C) | | | | | | | |
| URALAC P-2065[22] | | | | | | | |
| UPICACOAT GV-230[23] | | | | | | | |
| Hardener (D) | | | | | | | |
| Triglycidyl i-cyanurate | 5.9 | 6.8 | 7.8 | 10.7 | 12.4 | 13.6 | 8.1 |
| EHPE-3150[24] | | | | | | | |
| CURESOLE C[27]$_{172}$ | | | | | | | |
| Titanium dioxide | 51.0 | 51.0 | 51.0 | 59.0 | 59.0 | 59.0 | 53.0 |
| MODAFLOW[13] | 1.0 | 1.0 | 1.0 | 1.0 | 1.0 | 1.0 | 1.0 |
| DURCAL 40[14] | | | | | | | |
| COOH/Glycid. eq. ratio | 1.3 | 1.2 | 1.1 | 1.1 | 1.0 | 0.95 | 1.33 |

TABLE 4-continued

| Resin wt. ratio (A/B) | | | | | | | |
|---|---|---|---|---|---|---|---|
| Resin wt. ratio (A/C) | | | | | | | |
| Gloss (200°, 10 min)[28] | 20 | 6 | 21 | 37 | 21 | 35 | 57 |
| Gloss (180V, 20 min)[28] | 25 | 13 | 27 | 42 | 28 | 43 | 69 |
| Erichsen value (mm)[29] | 4.3 | >7.0 | >7.0 | >7.0 | >7.0 | >7.0 | 3.5 |
| impact resistance (cm) (½ φ", 1000 g)[30] | 30 | 50 | 50 | 50 | 50 | 50 | 20 |

| Components and Material Property | Comparative Example | | | | | | |
|---|---|---|---|---|---|---|---|
| | 27 | 28 | 29 | 30 | 31 | 32 | 33 |
| Polyester resin (A) | | | | | | | |
| FINEDIC A-229-M[15] | | | 80.0 | 80.0 | 80.0 | 95.6 | 80.0 |
| ESTER RESIN ER-8105[17] | | | | | | | |
| URALAC P-3500[18] | 80.0 | 80.0 | | | | | |
| Polyester resin (B) | | | | | | | |
| ESTER RESIN XE94002[19] | | | | | | | |
| ESTER RESIN XE93001[20] | 20.0 | 22.0 | | | | | 20.0 |
| FINEDIC M-8540[22] | | | 18.0 | 20.0 | 22.0 | | |
| Polyester resin (C) | | | | | | | |
| URALAC P-2065[22] | | | | | | | |
| UPICACOAT GV-230[23] | | | | | | | 34.0 |
| Hardener (D) | | | | | | | |
| Triglycidyl i-cyanurate | 9.2 | 10.4 | | | | 4.4 | 9.9 |
| EHPE-3150[24] | | | 23.3 | 28 | 31.9 | | |
| CURESOLE C$_{172}$[27] | | | 0.4 | 0.4 | 0.4 | | |
| Titanium dioxide | 53.0 | 53.0 | 51.0 | 51.0 | 51.0 | 66.0 | |
| MODAFLOW[13] | 1.0 | 1.0 | 1.0 | 1.0 | 1.0 | 1.0 | 1.0 |
| DURCAL 40[14] | | | | | | 40.0 | |
| COOH/Glycid. eq. ratio | 1.25 | 1.71 | 0.9 | 0.8 | 0.75 | 1.0 | 1.43 |
| Resin wt. ratio (A/B) | | | | | | | 80/20 |
| Resin wt. ratio (A/C) | | | | | | | 70/30 |
| Gloss (200°, 10 min)[28] | 45 | 52 | 63 | 53 | 65 | 68 | 24 |
| Gloss (180V, 20 min)[28] | 57 | 66 | 71 | 61 | 73 | 75 | 26 |
| Erichsen value (mm)[29] | >7.0 | >7.0 | >7.0 | >7.0 | 3.2 | 3.5 | 4.1 |
| impact resistance (cm) (½ φ", 1000 g)[30] | 50 | 50 | 50 | 50 | 20 | 30 | 30 |

| Components and Material Property | Comparative Example | | | | |
|---|---|---|---|---|---|
| | 34 | 35 | 36 | 37 | 38 |
| Polyester resin (A) | | | | | |
| FINEDIC A-229-M[15] | | | | 80.0 | |
| ESTER RESIN ER-8105[17] | 75.0 | 60.0 | 93.0 | | |
| URALAC P-3500[18] | | | | | 72.0 |
| Polyester resin (B) | | | | | |
| ESTER RESIN XE94002[19] | 25.0 | | | 20.0 | |
| ESTER RESIN XE93001[20] | | | | | 28.0 |
| FINEDIC M-8540[22] | | 40.0 | 7.0 | | |
| Polyester resin (C) | | | | | |
| URALAC P-2065[22] | 35.0 | | | 65.0 | 10.0 |
| UPICACOAT GV-230[23] | | 26.0 | 50.0 | | |
| Hardener (D) | | | | | |
| Triglycidyl i-cyanurate | 23.2 | 24.9 | 16.4 | 18.5 | 15.6 |
| EHPE-3150[24] | | | | | |
| CURESOLE C$_{172}$[27] | | | | | |
| Titanium dioxide | 79.0 | 65.0 | 70.0 | 89.0 | 59.0 |
| MODAFLOW[13] | 1.0 | 1.0 | 1.0 | 1.0 | 1.0 |
| DURCAL 40[14] | | | | | |
| COOH/Glycid. eq. ratio | 0.77 | 1.0 | 1.0 | 1.0 | 1.25 |
| Resin wt. ratio (A/B) | 75/25 | 60/40 | 93/7 | 80/20 | 72/28 |
| Resin wt. ratio (A/C) | 68/32 | 70/30 | 65/35 | 55/45 | 88/12 |
| Gloss (200°, 10 min)[28] | 16 | 75 | 85 | 68 | 79 |

TABLE 4-continued

| | | | | | |
|---|---|---|---|---|---|
| Gloss (180V, 20 min)[28] | 21 | 81 | 89 | 72 | 83 |
| Erichsen value (mm)[29] | 4.5 | 3.1 | >7.0 | >7.0 | >7.0 |
| impact resistance (cm) (½ φ", 1000 g)[30] | 30 | 20 | 50 | 40 | 50 |

Notes in Tables 1-4:

[1] Trademark of the product of Nippon Ester Co.,Ltd.: a hydroxyl group-containing polyester resin having a hydroxyl value of 31 mg KOH/g and a Tg of 66° C.
[2] Trademark of the product of Japan Upica Co., Ltd.: a hydroxyl group-containing polyester resin having a hydroxyl value of 34 mg KOH/g and a Tg of 59° C.
[3] Trademark of the product of Dainippon Ink & Chemicals, Inc.: a hydroxyl group-containing polyester resin having a hydroxyl value of 30 mg KOH/g and a Tg of 53° C.
[4] Trademark of the product of Nippon Ester Co., Ltd.: a hydroxyl group-containing polyester resin having a hydroxyl value of 31 mg KOH/g and a Tg of 61° C.
[5] Trademark of the product of McWHORTER Technologies, Inc.: a hydroxyl group-containing polyester resin having a hydroxyl value of 295 mg KOH/g and a Tg of 44° C.
[6] Trademark of the product of Nippon Ester Co., Ltd.: a hydroxyl group-containing polyester resin having a hydroxyl value of 234 mg KOH/g and a Tg of 48° C.
[7] Trademark of the product of McWHORTER Technologies, Inc.: a hydroxyl group-containing polyester resin having a hydroxyl value of 136 mg KOH/g and a Tg of 49° C.
[8] Trademark of the product of Japan Upica Go.,Ltd.: a hydroxyl group-containing polyester resin having a hydroxyl value of 51 mg KOH/g and a Tg of 57° C.
[9] Trademark of the product of Nippon Ester Co.,Ltd.: a hydroxyl group-containing polyester resin having a hydroxyl value of 40 mg KOH/g and a Tg of 65° C.
[10] Trademark of the product of Hüls AG: a blocked isocyanate compound: an ε-caprolactam-blocked isophorone diisocyanate: equivalent weight = 280 (g/eq.), Tg = 50° C.
[11] Trademark of the product of McWHORTER Technologies, Inc.: a blocked isocyanate compound: an ε-caprolactam-blocked isophorone diisocyanate: equivalent weight = 240 (g/eq.).Tg = 52° C.
[12] Trademark of the product of American Cyanamid Co..: glycolyl tetramethoxymethyl: equivalent weight = 107 (g/eq.), M.P. = 100° C.
[13] Trademark of the product of Monsanto Co., a leveling agent
[14] Trademark of the product of Hoechst Gosei K.K.: an extender pigment: average particle size = 30 μm
[15] Trademark of the product of Dainippon Ink & Ghemicals, Inc.: a carboxyl group-containing polyester resin having an acid value of 24 mg KOH/g and a Tg of 77° C.
[16] Trademark of the product of Dainippon Ink & Chemicals, Inc.: a carboxyl group-containing polyester resin having an acid value of 26 mg KOH/g and a Tg of 69° C.
[17] Trademark of the product of Nippon Ester Co., Ltd.: a carboxyl group-containing polyester resin having an acid value of 45 mg KOH/g and a Tg of 63° C.
[18] Trademark of the,product of DSM Resins BV: a carboxyl group-containing polyester resin having an acid value of 30 mg KOH/g and a Tg of 65° C.
[19] Trademark of the product of Nippon Ester Co..Ltd.: a carboxyl group-containing polyester resin having an acid value of 125 mg KOH/g and a Tg of 56° C.
[20] Trademark of the product of Nippon Ester Co., Ltd.: a carboxyl group-containing polyester resin having an acid value of 180 mg KOH/g and a Tg of 55° C.
[21] Trademark of the product of Dainippon Ink & Chemicals, Inc.: a carboxyl group-containing polyester resin having an acid value of 220 mg KOH/g and a Tg of 57° C.
[22] Trademark of the product of DSM Resins BV: a carboxyl group-containing polyester resin having an acid value of 80 mg KOH/g and a Tg of 60° C.
[23] Trademark of the product of Japan Upica Co..Ltd.: a carboxyl group-containing polyester resin having an acid value of 55 mg KOH/g and a Tg of 69° C.
[24] Trademark of the product of Daicel Chemical Ind..Ltd.: an alicyclic epoxy resin with an equivalent weight of 185 (g/eq.) and a softening point of 74° C.
[25] Trademark of the product of Yuka Shell Epoxy K.K.: an epi-bis type epoxy resin with an equivalent weight of 750 (g/eq.) and an softening point of 96° C.
[26] Trademark of the product of Rohm & Haas Co.: a β-hydroxy alkylamide (HAA) with an,equivalent weight of 84 (g/eq.) and a M.P.ot 123° C.
[27] Trademark of the product of Shikoku Chemicals Corp.: 2-heptadecyl imidazole.a curing catalyst; M.W.= 222, M.P.= 88° C.
[28] Gloss value: according to JIS K-5400 (1990) 7.6. "Specular Gloss (60°)"
[29] Erichsen value: according to JIS K-5400 (1990) 8.2.2. "Break Distance Method"
[30] Impact resistance: according to JIS K-5400 (1990) 8.3.2. on DuPont-Method As seen in Tables 1 and 2, the experimental conditions of Examples 1, 2 and 3 as well as those of Examples 14, 15 and 16 were selected in such a manner that the weight proportion of the polyester resin (B) differs by about 10% successively. The results of these Examples showed that the increase in the gloss value by such difference in the resin content amounts to at the most only 4 (i.e. 9 minus 5) which is well within a visually indiscrimiable range. Also, the experimental conditions in each ternary experimental group of Examples 4, 5 and 6, of Examples 7, 8 and 9, of Examples 10, 11 and 12, of Examples 17, 18 and 19, of Examples 20, 21 and 22 or of Examples 23, 24 and 25 were selected so that the weight proportion of the polyester resin (B) differs by about 10% successively. They also indicate that the difference in the gloss value among each three experiments falls under a visually indiscriminable range. The hardeners used in Examples 13, 26 and 27 were an amino compound, an epi-bis type epoxy resin and an amide compound, respectively.

Comparative Examples 1 to 12 and Comparative Examples 20 to 31 as recited in Tables 3 and 4, respectively, represent the cases of using a binary polyester resin mixture, wherein each set of three Comparative Examples, namely, Comparative Examples 1 to 3, Comparative Examples 4 to 6, Comparative Examples 7 to 9, Comparative Examples 10 to 12, Comparative Examples 20 to 22, Comparative Examples 23 to 25, Comparative Examples 26 to 28 and Comparative Examples 29 to 31, represents the case in which the weight proportion of the polyester resin (B) differs by about 10% successively. The results of these experiments showed that the resulting gloss values of the coatings were visually discriminable from each other. It was also shown that the gloss value differed when the baking condition was different. Comparative Examples 13 and 32 represent the case where the delustreing was attained by the employment of an extender pigment, which both gave gloss values over 50, with quite inferior coating film properties, e.g. Erichsen value and impact resistance.

In Comparative Examples 14, 15, 33 and 34 as given in Tables 3 and 4, the equivalent ratio of the constituent polyester resins relative to the hardener was outside the range defined according to the present invention. The results of these Comparative Examples show that the coating film properties, e.g. Erichsen value and impact resistance, are inferior.

In Comparative Examples 16 to 19 and Comparative Examples 35 to 38, the blend proportion of the polyester resins was chosen to be outside the range defined according to the present invention, wherein Comparative Examples 16, 17, 35 and 36 represent the case where the weight ratio of the polyester resin (A) to the polyester resin (B) was outside the inventive range, whereas Comparative Examples 18, 19, 37 and 38 represent the case where the weight ratio of the polyester resin (A) to the polyester resin (C) was outside the inventive range. The gloss values of the resulting coatings in these Comparative Examples were over 60, so that they do not fall under the scope of the present invention.

We claim:

1. A powder coating composition for forming a low gloss coating film based on thermosetting polyester resins, comprising three thermosetting polyester resins (A), (B) and (C) and a hardener (D), the weight ratio of the polyester resin (A) to the polyester resin (B) being in the range of 90/10–70/30 and that of the polyester resin (A) to the polyester resin (C) in the range of 85/15–60/40 and the equivalent ratio of the polyester resin (A, B or C) to the hardener (D) being each in the range of 0.8 to 1.25, wherein the polyester resins (A), (B) and (C) are selected from those in which the moduli of elasticity $E_a$, $E_b$ and $E_c$ for the products of the curing reactions of the resins (A), (B) and (C) with the hardener (D), respectively, after 3 minutes' curing with the hardener (D) at 200° C. hold a relationship that the differences between the moduli of elasticity $E_{b-a}=E_b-E_a$ and $E_{c-a}=E_c-E_a$ are maintained in the following ranges, respectively:

$$20 \text{ dyn/cm}^2 < E_{b-a} < 10^3 \text{ dyn/cm}^2 \text{ and}$$

$$1 \text{ dyn/cm}^2 < E_{c-a} < 10 \text{ dyn/cm}^2$$

2. A powder coating composition as claimed in claim 1, wherein the polyester resins (A), (B) and (C) are hydroxyl group-containing polyester resins each having a glass transition temperature Tg of 35°–100°C.

3. A powder coating composition as claimed in claim 2, wherein the hardener (D) is a blocked isocyanate compound.

4. A powder coating composition as claimed in claim 2, wherein the hardener (D) is an amino compound.

5. A powder coating composition as claimed in claim 1, wherein the polyester resins (A), (B) and (C) are carboxyl group-containing polyester resins each having a glass transition temperature Tg of 35°–100° C.

6. A powder coating composition as claimed in claim 5, wherein the hardener (D) is a glycidyl compound.

7. A powder coating composition as claimed in claim 5, wherein the hardener (D) is an amide compound.

* * * * *